UNITED STATES PATENT OFFICE.

FREDERICK W. KING, OF LONDON, ONTARIO, CANADA.

PROCESS OF MAKING SEMISTEEL AND THE PRODUCT THEREOF.

988,270.  Specification of Letters Patent.  Patented Mar. 28, 1911.

No Drawing.  Application filed February 3, 1910.  Serial No. 541,842.

*To all whom it may concern:*

Be it known that I, FREDERICK W. KING, a citizen of the United States, residing at the city of London, Province of Ontario, Dominion of Canada, have invented a certain new and useful Improvement in Processes of Making Semisteel and the Product Thereof, and declare the following to be a full, clear, and exact description of the same, such as will enable others skilled in the art to which it pertains to make and use the same.

My invention relates to a new composition of semi-steel metal possessing peculiar characteristics and to the process of manufacturing the same not heretofore known or used, the metal possessing various valuable qualities for many purposes, especially where a high degree of heat-resisting quality is required, and great resistance to sulfurous and other noxious gases generated by the burning of many grades of soft coal, as, for instance, its use as stove linings, grates, etc.

I have found that it is preferable to manufacture this metal in small cupolas, say about thirty inches, and it consists substantially and approximately of the following proportions and ingredients which are charged therein in the manner hereinafter specified. I take of cast scrap iron 35 pounds; sheet steel clippings, such as are the waste produce of sheet steel used in the manufacture of stoves and the like articles, 30 pounds; of the remelts from sprues, gates, etc., in the manufacture of this material, 30 pounds; of 10% silicon pig iron 5 pounds. These proportions are used in a charge as hereinafter stated and about ten charges are used in the cupola for a melt as follows: While these proportions are suitable for a 30 inch cupola as already stated, they may be varied so long as the substantial proportion is maintained.

In order to start the melting and to continue the process of manufacture of my peculiar semi-steel or steely iron, I use the following process: Preliminarily, I bed the cupola with 200 pounds of coke upon which is placed 200 pounds of cast scrap; this bedding of coke is to warm the cupola, melt the scrap and prepare it for the higher heat necessary to produce the steely iron made from the further charging of the materials as follows: First, upon the aforesaid 200 pounds of cast iron scrap I charge about 10 pounds of coke; then of the sheet steel clippings 30 pounds; the semi-steel remelts of sprues, gates, 30 pounds; the cast iron scrap 35 pounds; of silicon pig iron 5 pounds, with 3 pounds of lime for fluxing. In firing the cast iron scrap is first melted and a part is drawn off as cast iron, by which time the cupola will be hot enough to produce the melting and homogeneous mixture of the steel clippings, re-melts, cast scrap and silicon pig iron. Nine more charges composed practically in the proportions as already stated follow in order after tapping out the cast iron. At the tenth charge I drop to 7 pounds of coke, and continue this up to and including about 40,000 pounds of meltings. I use a blast of about 16 ounces pressure. By continually charging in the proportions specified the capacity of such a cupola is about 4,000 pounds per day with one man's labor, although two men can take off twice this, or 8000 pounds per day. After the bed iron of 200 pounds of scrap is run off the slag hole should be tapped before running off the mixture, using a ⅜ tap and slag hole. After this the semi-steel is run off and molded in any form desired. The semi-steel produced from this mixture is comparatively very hard, much harder than cast iron; has more than twice the shrinkage of cast gray iron, is about 12% heavier, and is so very hard and close grained that it does not permit the fumes of sulfur or sulfurous acid of gas or coal to penetrate its pores, and thus rot and disintegrate the iron when used as stove linings, grate bars. Here the shrinkage is of no material consequence and can be allowed for, and for which I have found it peculiarly adapted. In places where the ordinary stove cast iron linings have a life of only three to four months I have found that this metal resists such deleterious action indefinitely and even after 18 months' use appears to be as good as when they were placed in position.

It will be understood that the molten mixture can be cast in sand molds substantially the same as casting ordinary cast iron, and therefore it can be made in many different forms where great shrinkage is not objectionable and where the castings alone can be used without tooling.

Having thus described my invention, what I desire to claim is:

1. The process of making semi-steel consisting in placing in a cupola after heating, successive charges of sheet steel clippings, re-melts from the previous castings of this semi-steel, cast scrap iron and a high grade 10% silicon pig iron, adding fluxing material, firing and melting this mixture and casting the same in homogeneous castings, substantially as described.

2. A semi-steel cast iron produced by fusing together substantially 35 pounds of cast scrap iron, 30 pounds of sheet steel clippings, 30 pounds of semi-steel re-melts and 5 pounds 10% silicon pig iron with an appropriate flux, substantially as described.

In testimony whereof, I sign this specification in the presence of two witnesses.

FREDERICK W. KING.

Witnesses:
R. A. PARKER,
VIRGINIA C. SPRATT.

---

Copies of this patent may be obtained for five cents each, by addressing the "Commissioner of Patents, Washington, D. C."